A. A. PINDSTOFTE.
APPARATUS FOR IMPREGNATING LIQUIDS WITH CARBONIC ACID OR OTHER GASES.
APPLICATION FILED SEPT. 17, 1914.
1,209,490.
Patented Dec. 19, 1916.
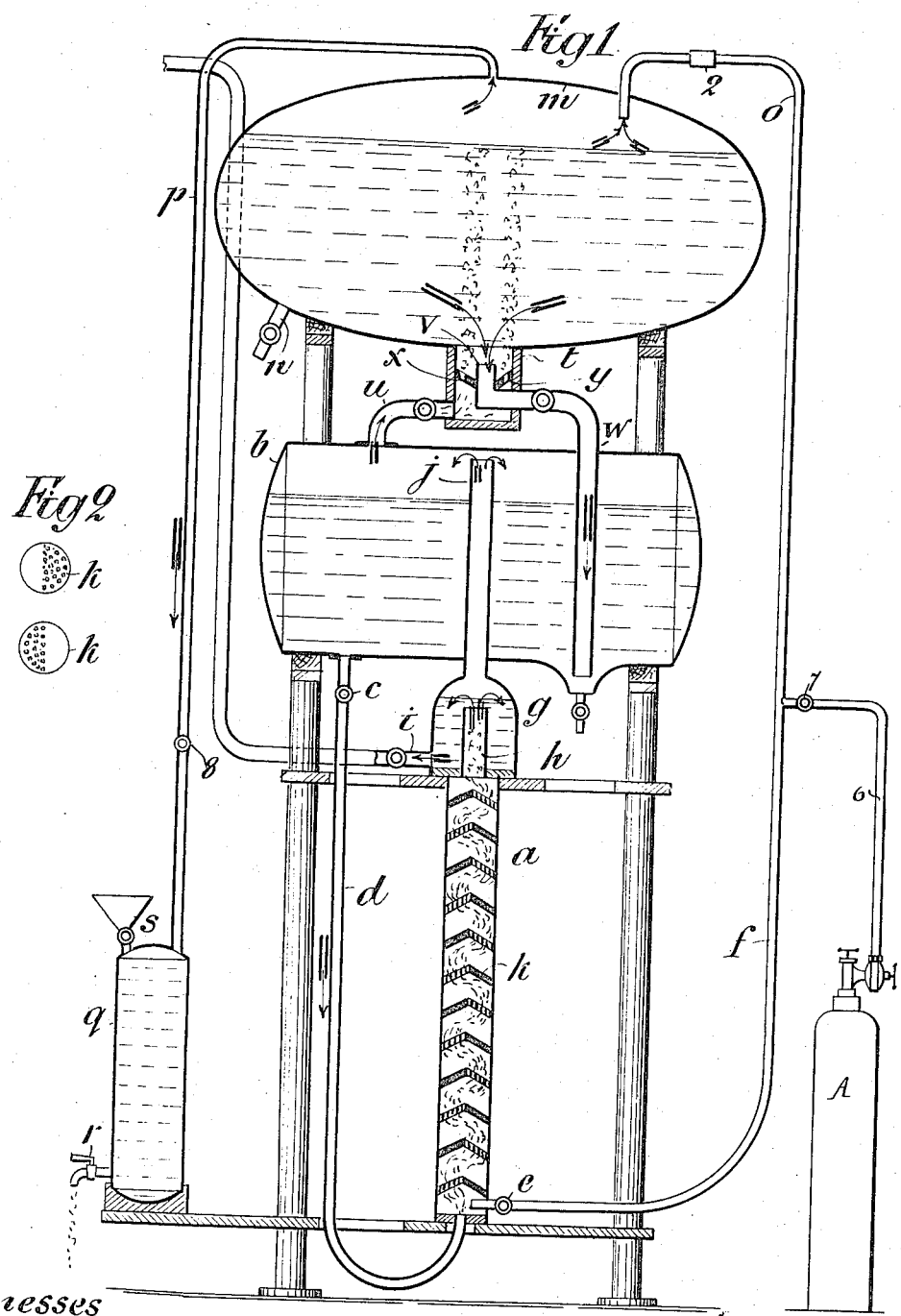

UNITED STATES PATENT OFFICE.

ANDERS ANDERSEN PINDSTOFTE, OF COPENHAGEN, DENMARK.

APPARATUS FOR IMPREGNATING LIQUIDS WITH CARBONIC ACID OR OTHER GASES.

1,209,490.   Specification of Letters Patent.   Patented Dec. 19, 1916.

Application filed September 17, 1914. Serial No. 862,149.

*To all whom it may concern:*

Be it known that I, ANDERS ANDERSEN PINDSTOFTE, manufacturer, citizen of the Kingdom of Denmark, residing at No. 62 Frederiksberg Alle, Copenhagen, Denmark, have invented certain new and useful Improvements in Apparatus for Impregnating Liquids with Carbonic Acid or other Gases, of which the following is a specification.

My invention relates to an improved apparatus by which the liquid and the carbonic acid are supplied to the bottom of a closed impregnating chamber, which is provided with perforated partitions arranged at suitable distances apart across the chamber, and through the perforations of which partitions the liquid and the carbonic acid ascend in such a manner that the carbonic acid expels the air contained in the liquid and that said liquid is saturated with carbonic acid, whereupon the impregnated and saturated liquid may be discharged from the top of the chamber. When however in such apparatus, only small quantities are discharged, and the supply of carbonic acid to the apparatus is correspondingly diminished, it happens that the carbonic acid flows through portions only of the liquid contained in the impregnating chamber, because the carbonic acid ascends through portions only of the partitions; or, if the apparatus slopes, through only one side of the apparatus so that the air is not completely expelled from the liquid and consequently said liquid is not completely saturated with carbonic acid. Said drawback is avoided by the present invention according to which the perforated partitions are of such a shape that the ascending carbonic acid is caused to flow through all parts of the liquid contained in the chamber whether the supply of carbonic acid is large or small, so that in all cases the liquid will be fully saturated with carbonic acid. This result is obtained by making the partitions of the impregnating chamber gable, or roof-shaped and by only perforating one half or about one half of each of said partitions, and by arranging said partitions in such a manner that in the full height of the chamber a perforated part is arranged over a non-perforated part and a non-perforated part over a perforated part, so that the ascending carbonic acid and liquid currents are caused to follow the same zigzag course during their passage through said chamber and that consequently all parts of said liquid come in contact with the carbonic acid particles.

The accompanying drawing, forming a part of this application, illustrates one embodiment of my invention.

Figure 1 is a partially vertical section through the apparatus with parts in elevation, and Fig. 2 is a plan view of two juxtaposed partially perforated partitions.

The apparatus consists of a narrow and relatively high closed impregnating chamber $a$ to which the liquid to be impregnated is supplied from a higher arranged liquid-reservoir $b$ through a pipe $d$ provided with a valve $c$, which pipe debouches in the bottom of the chamber. The carbonic acid is supplied to the chamber $a$ from a reservoir $A$ through a pipe 6 having a controlling valve 7 therein, said pipe 6 being connected to a pipe $f$ provided with a valve $e$, which pipe $f$ debouches near the bottom of the chamber.

A discharge chamber $g$ is arranged directly over the impregnating chamber $a$ and is connected to said chamber $a$ by a pipe $h$ open at both ends so that the impregnated liquid from the chamber $g$ can flow to the bottling apparatus through a pipe $i$ provided with a valve 5, while the air expelled from the impregnated liquid and the quantity of carbonic acid necessary for the filling of the space in the liquid reservoir $b$, from which the liquid is taken, flow to the top of said liquid reservoir through a vertical pipe $j$ leading from the top of said chamber $g$.

The impregnating chamber is provided from bottom to top with suitably-spaced gable, or roof-shaped partitions $k$, arranged one above another. One half or wing of each of said partitions is solid or imperforate while the other half or wing is perforated (Fig. 2). The partitions are arranged throughout the entire extent of the chamber in such a manner that the perforated wing of each partition directly overlies the non-perforated wing of the next lower partition, while the non-perforated wing of each partition directly overlies the perforated wing of the next lower partition, so that the ascending carbonic acid and liquid currents are caused to follow the same zigzag course during their passage through said chamber. Consequently all portions of said liquid come in contact with the carbonic acid whether the supply of carbonic acid is large or small.

When the liquid reservoir $b$ is emptied it is refilled from a higher arranged preferably elliptical supply-reservoir $m$, which in turn is supplied with liquid through a valved pipe $n$. The reservoir $m$ is connected to the carbonic acid supply-pipe $f$ by a pipe $o$ provided with a non-return valve 2. The reservoir $m$ is further provided with a pipe $p$ having a valve 8, which pipe is connected to an air-discharge controller $q$, provided at its top with a funnel $s$ and at its bottom with a cock $r$.

The reservoir $m$ is in free communication at its bottom with a cylindrical chamber $t$ the lower part of which is connected to the top of the liquid reservoir $b$ by a pipe $u$ provided with a valve 4. The offset upper end of an open-ended vertical pipe $v$ is arranged centrally in the chamber $t$ which pipe passes through one side of said chamber and is provided with a valve 3, the lower end of the pipe debouching in a depression in the bottom of the liquid reservoir $b$. Between the pipe $v$ and the wall of the chamber $t$ a funnel-shaped partition $x$ is arranged, which is provided with annular series of fine holes $y$.

The operation of the apparatus is as follows:—It is supposed that the reservoirs $b$ and $m$ are filled and that the valves 4 and 3 of the pipes $u$ and $v$ are closed. The valve $c$ is opened and liquid flows from below into the chamber $a$. Then the valve $e$ is opened. The carbonic acid ascends together with the liquid through the chamber $a$, expels the air contained in the liquid and replaces it. The expelled air and the superfluous carbonic acid flow through the pipe $j$ into the reservoir $b$ and fill the space in said reservoir from which the liquid is taken. The impregnated liquid flows to the bottling apparatus through the pipe $i$, when the valve 5 of said pipe is opened. When the reservoir $b$ is emptied the valves $c$ and $e$ are closed and the valves 4 and 3 of the pipes $u$ and $v$ opened. Through pipe $v$ liquid from the supply reservoir $m$ will then flow to the liquid reservoir $b$, and the air and the carbonic acid contained in said reservoir will be forced into the reservoir $m$ through the pipe $u$ and the holes $y$ of the partition $x$, through which holes said air and carbonic acid will ascend in the shape of a cylindrical or tubular body through which the liquid is caused to pass in flowing to the pipe $v$, and consequently said liquid will be partially impregnated with the ascending carbonic acid. The carbonic acid which is not absorbed by the liquid and the air collect at the top of the supply reservoir where said mixture due to its different specific gravities separates in such a manner that at the top air mixed with a small quantity of carbonic acid and below carbonic acid mixed with a small quantity of air are found. The upper portion of the mixture, which consists substantially of air, escapes through pipe $p$ to the air discharge-controller $q$ whence it is discharged.

The pipe $o$ is provided with a non-return valve 2, through which the carbonic acid, stored in said pipe below said valve, is supplied to the impregnating chamber $a$, when liquid is supplied to the reservoir $m$ so that said carbonic acid is used again together with fresh carbonic acid. For the above purposes the pipe $o$ debouches at some distance from the top of the reservoir $m$ while the pipe $p$ leads from the top of said reservoir.

Before beginning operations the air discharge-controller $q$ is filled with liquid and the valve of the funnel $s$ closed. When air is discharged the cock $r$ is opened so that the liquid is discharged in drops and replaced by the air supplied through the pipe $p$ from the reservoir $m$. Of course the air discharge can be fully controlled by suitable adjustment of the cock $r$, and the air can be discharged in a quiet manner.

When the air discharge-controller $q$ is emptied the valve 8 of the pipe $p$ and the cock $r$ are closed whereupon the valve of the funnel $s$ is opened and fresh liquid supplied to the controller.

By the improved apparatus the following new technical effects are obtained:—The liquid is fully saturated with carbonic acid whether the supply of carbonic acid is large or small so that the liquid always will be completely impregnated. The liquid can be impregnated by a much lower pressure than hitherto, as the shape and the arrangement of the perforated partitions cause all parts of the liquid to come in contact with the carbonic acid. The air expelled from the liquid can be discharged without carrying away considerable quantities of carbonic acid. The liquid is partially impregnated by the superfluous carbonic acid during its passage to the liquid reservoir.

Partitions as described can of course be used by all kinds of impregnating apparatus, in which liquid and carbonic acid ascend together through a closed impregnating chamber from the top of which the impregnated liquid is discharged.

I claim:

1. In carbonating apparatus, the combination of a closed, vertical impregnating chamber; a supply pipe for carbonic acid leading into the bottom of said chamber; a liquid reservoir above said chamber; a pipe connection between the bottom of said reservoir and the bottom of said chamber; an air outlet pipe leading from the top of said chamber to the top of said reservoir; and a discharge pipe for the carbonated liquid leading from the top of said chamber, said chamber having gable-shaped partitions arranged above one another therein in spaced relation throughout its entire extent, one wing of each partition being perforated and the other wing imperforate, the perforated wing of each partition directly overlying the imperforate wing of the next lower partition, and the imperforate wing of each partition directly overlying the perforated wing of the next lower partition, whereby the ascending carbonic acid and liquid currents are caused to follow the same zigzag course during their passage through said chamber so that all portions of said liquid come into contact with and are impregnated by said carbonic acid.

2. In carbonating apparatus, the combination of a closed, vertical impregnating chamber; a supply pipe for carbonic acid leading into the bottom of said chamber; a liquid reservoir above said chamber; a pipe leading from the bottom of said reservoir to the bottom of the impregnating chamber; an air outlet pipe leading from the top of said chamber to the top of said reservoir; a discharge pipe for the carbonated liquid leading from the top of said chamber, said chamber having gable-shaped partitions arranged above one another therein in spaced relation throughout its entire extent, one wing of each partition being perforated and the other wing imperforate, the perforated wing of each partition directly overlying the imperforate wing of the next lower partition, and the imperforate wing of each partition directly overlying the perforated wing of the next lower partition, whereby the ascending carbonic acid and liquid currents are caused to follow the same zigzag course during their passage through said chamber so that all portions of said liquid come into contact with and are impregnated by said carbonic acid; a supply reservoir arranged over the first-named reservoir; a pipe leading from the bottom of the second-named reservoir to the bottom of said first-named reservoir; a partition having holes along its edge and surrounding the upper end of said pipe; and a pipe leading from the top of the said first-named reservoir and debouching below the last-named partition.

3. In carbonating apparatus, the combination of a closed, vertical impregnating chamber; a supply pipe for carbonic acid leading into the bottom of said chamber; a liquid reservoir above said chamber; a pipe leading from the bottom of said reservoir to the bottom of said chamber; an air outlet pipe leading from the top of said chamber to the top of said reservoir; a discharge pipe for the carbonated liquid leading from the top of said chamber, said chamber having gable-shaped partitions arranged above one another therein in spaced relation throughout its entire extent, one wing of each partition being perforated and the other wing imperforate, the perforated wing of each partition directly overlying the imperforate wing of the next lower partition, and the imperforate wing of each partition directly overlying the perforated wing of the next lower partition, whereby the ascending carbonic acid and liquid currents are caused to follow the same zigzag course during their passage through said chamber so that all portions of said liquid come into contact with and are impregnated by said carbonic acid; an air discharge controller adapted to be filled with liquid and having a cock at its bottom for enabling the liquid to be discharged therefrom in drops; and a pipe connection between said reservoir and said controller for supplying air from the former to the latter.

4. In carbonating apparatus, the combination of a closed, vertical impregnating chamber; a supply pipe for carbonic acid leading into the bottom of said chamber; a liquid reservoir above said chamber; a pipe leading from the bottom of said reservoir to the bottom of said chamber; an air outlet pipe leading from the top of said chamber to the top of said reservoir; a discharge pipe for the carbonated liquid leading from the top of said chamber, said chamber having gable-shaped partitions arranged above one another therein in spaced relation throughout its entire extent, one wing of each partition being perforated and the other wing imperforate, the perforated wing of each partition directly overlying the imperforate wing of the next lower partition, and the imperforate wing of each partition directly overlying the perforated wing of the next lower partition, whereby the ascending carbonic acid and liquid currents are caused to follow the same zigzag course during their passage through said chamber so that all portions of said liquid come into contact with and are impregnated by said carbonic acid; a supply reservoir arranged over the first-named reservoir; a pipe leading from the bottom of the second-named reservoir to the bottom of said first-named reservoir; a partially perforated partition surrounding the upper end of said pipe; a pipe leading from the top of the first-named reservoir and debouching below the last-named partition; a carbonic acid discharge pipe leading from the upper part of the second-named reservoir to the carbonic acid supply pipe of the said chamber; an air discharge controller adapted to be filled with liquid and having a cock at its bottom for enabling the liquid to be discharged therefrom in drops; and a pipe leading from the top of the second-named reservoir to said controller for supplying air from the former to the latter.

5. In carbonating apparatus, the combination of a vertical, tubular impregnating chamber; separate means for supplying the liquid to be carbonated and carbonic acid to the bottom of said chamber; and a pipe leading from the top of said chamber for discharging the carbonated liquid therefrom, said chamber having gable-shaped partitions arranged above one another therein in spaced relation throughout its entire extent, one wing of each partition being perforated and the other wing imperforate, the perforated wing of each partition directly overlying the imperforate wing of the next lower partition, and the imperforate wing of each partition directly overlying the perforated wing of the next lower partition, whereby the ascending carbonic acid and liquid currents are caused to follow the same zigzag course during their passage through said chamber so that all portions of said liquid come into contact with and are impregnated by said carbonic acid.

In testimony whereof I affix my signature in presence of two witnesses.

ANDERS ANDERSEN PINDSTOFTE.

Witnesses:
MARCUS MOIELEE,
VALDMAR MIELSLE.